(12) United States Patent
Furuta (10) Patent No.: US 10,784,019 B2
(45) Date of Patent: Sep. 22, 2020

(54) CABLE

(71) Applicant: FANUC CORPORATION, Yamanashi (JP)

(72) Inventor: Tomoyuki Furuta, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/250,319

(22) Filed: Jan. 17, 2019

(65) Prior Publication Data

US 2019/0228881 A1 Jul. 25, 2019

(30) Foreign Application Priority Data

Jan. 19, 2018 (JP) ................. 2018-007269

(51) Int. Cl.

| H01B 7/30 | (2006.01) |
|---|---|
| H01B 7/02 | (2006.01) |
| B23H 11/00 | (2006.01) |
| B23H 7/04 | (2006.01) |
| H01B 7/28 | (2006.01) |
| H01B 11/18 | (2006.01) |
| B23H 1/00 | (2006.01) |

(52) U.S. Cl.
CPC .............. *H01B 7/30* (2013.01); *B23H 7/04* (2013.01); *B23H 11/006* (2013.01); *H01B 7/02* (2013.01); *H01B 7/0233* (2013.01); *B23H 1/00* (2013.01); *H01B 7/28* (2013.01); *H01B 11/1843* (2013.01); *H01B 11/1847* (2013.01)

(58) Field of Classification Search
CPC .......... H01B 7/30; H01B 7/02; H01B 7/0233; H01B 7/28

USPC .......................................................... 174/28
See application file for complete search history.

(56) References Cited

U.S. PATENT DOCUMENTS

| 3,483,313 A * | 12/1969 | Schaffhauser ....... | H01B 7/0072 174/101.5 |
|---|---|---|---|
| 4,385,021 A * | 5/1983 | Neeley ................. | H01B 7/0072 138/111 |
| 4,463,814 A * | 8/1984 | Horstmeyer .......... | E21B 44/005 175/45 |
| 5,304,739 A * | 4/1994 | Klug ..................... | H01B 3/443 174/102 R |

(Continued)

FOREIGN PATENT DOCUMENTS

| CA | 2186336 A1 | 5/1997 |
|---|---|---|
| EP | 0774816 A2 | 5/1997 |

(Continued)

OTHER PUBLICATIONS

English Abstract of European Publication No. 0774816 A2, published May 21, 1997, 1 pg.
English Machine Translation of Japanese Publication No. 03-219505 A, published Sep. 26, 1991, 4 pgs.
Extended European Search Report for European Patent Application No. 19152246.5, dated Apr. 30, 2019, 8 pgs.

(Continued)

*Primary Examiner* — Timothy J Thompson
*Assistant Examiner* — Amol H Patel
(74) *Attorney, Agent, or Firm* — Fredrikson & Byron, P.A.

(57) ABSTRACT

A cable includes: a linear conductor; a plurality of resin hollow tubes which are disposed around the conductor so that an air layer is formed around the conductor and which extend in a longitudinal direction of the conductor; and an insulating protective member configured to protect the conductor and the plurality of hollow tubes.

6 Claims, 9 Drawing Sheets

(56) References Cited

U.S. PATENT DOCUMENTS

| | | | | |
|---|---|---|---|---|
| 2006/0219668 | A1* | 10/2006 | Kawahara | B23H 1/10 |
| | | | | 219/69.12 |
| 2011/0209892 | A1* | 9/2011 | Metz | H01B 11/1843 |
| | | | | 174/102 R |
| 2015/0144375 | A1* | 5/2015 | Hashimoto | H01B 3/307 |
| | | | | 174/113 R |
| 2017/0361789 | A1* | 12/2017 | Ohgushi | B60R 16/0215 |
| 2018/0286537 | A1* | 10/2018 | Horiuchi | C08L 23/20 |
| 2019/0228880 | A1* | 7/2019 | Furuta | B23H 7/04 |

FOREIGN PATENT DOCUMENTS

| | | | | |
|---|---|---|---|---|
| JP | 54139085 | A | | 10/1979 |
| JP | 59148210 | A | | 8/1984 |
| JP | 2131211 | U | | 10/1990 |
| JP | 3219505 | A | | 9/1991 |
| JP | 719913 | U | | 4/1995 |
| JP | 1034445 | A | | 2/1998 |
| JP | 2005294209 | A | | 10/2005 |
| JP | 2006281395 | A | | 10/2006 |
| JP | 2010129525 | A | | 6/2010 |
| JP | 2011198644 | A | * | 10/2011 |
| JP | 2011198644 | A | | 10/2011 |
| JP | 2012507128 | A | | 3/2012 |
| JP | 2013149494 | A | | 8/2013 |
| JP | 2017082149 | A | | 5/2017 |
| JP | 2017228506 | A | * | 12/2017 |

OTHER PUBLICATIONS

English Abstract for Japanese Publication No. 2006-281395 A, published Oct. 19, 2006, 2 pgs.
English Abstract for Japanese Publication No. 2013-149494 A, published Oct. 19, 2006, 1 pg.
English Abstract and Machine Translation for Japanese Publication No. 2011-198644 A, published Oct. 6, 2011, 10 pgs.
English Abstract and Machine Translation for Japanese Publication No. 2005-294209 A, published Oct. 20, 2005, 8 pgs.
English Machine Translation for Japanese Publication No. 07-019913 U, published Apr. 7, 1995, 5 pgs.
English Abstract and Machine Translation for Japanese Publication No. 2010-129525 A, published Jun. 10, 2010, 11 pgs.
English Machine Translation of Japanese Publication No. S54-139085 A, published Oct. 29, 1979, 3 pgs.
English Machine Translation of Japanese Publication No. 2012-507128 A, published Mar. 22, 2012, 7 pgs.
Partial English Machine Translation of Japanese Publication No. H02-131211 U, published Oct. 31, 1990, 1 pg (including English Machine Translation of Notice of Reasons for Refusal mailed by Japan Patent Office for Application No. 2018-007269, dated Nov. 12, 2019, 5 pgs, citing Japanese Publication No. JPH02-131211 U).
English Abstract and Machine Translation of Japanese Publication No. H10-034445 A, published Feb. 10, 1998, 17 pgs.
English Machine Translation of Japanese Publication No. S59-148210 A, published Aug. 24, 1984, 5 pgs.
English Abstract and Machine Translation for Japanese Publication No. JP2017-082149A, published May 18, 2017, 18 pgs.

* cited by examiner

CABLE

CROSS-REFERENCE TO RELATED APPLICATION

This application is based upon and claims the benefit of priority from Japanese Patent Application No. 2018-007269 filed on Jan. 19, 2018, the contents of which are incorporated herein by reference.

BACKGROUND OF THE INVENTION

Field of the Invention

The present invention relates to a cable employed for a wire electrical discharge machine, for example.

Description of the Related Art

A wire electrical discharge machine is disclosed which includes a work pan in which a dielectric working fluid is stored, a table which is provided in the work pan and on which a workpiece is placed, and a voltage application device for applying a voltage between a wire and the table (refer to Japanese Laid-Open Patent Publication No. 2006-281395).

SUMMARY OF THE INVENTION

In the wire electrical discharge machine described in Japanese Laid-Open Patent Publication No. 2006-281395, the cable for application of voltage may be immersed in the working fluid. In this case, the conductor of the cable and the table at the ground potential are electrostatically coupled through the working fluid and then leakage of electricity from the cable is likely to occur. In particular, in the case of a dielectric working fluid mainly containing water, alternating current (AC) voltage is applied so as to avoid corrosion of the workpiece. In general, the frequency is increased even up to several megahertz, as the surface roughness after processed in the finishing work becomes finer. As the frequency becomes higher, the influence of leakage due to electrostatic coupling becomes worse, and the peak value of the AC machining voltage becomes smaller as the surface area of the cable in contact with the working fluid becomes larger, resulting in unstable discharge.

It may be suggested that a member with a low relative permittivity be provided around the conductor so as to suppress leakage from the cable. However, even when fluororesin, having a generally low permittivity, for example, is employed as the low relative permittivity member, there is a concern that it will be difficult to reduce the capacitance occurring between the conductor and working fluid to such an extent that the leakage from the cable can be practically suppressed.

Accordingly, an object of the present invention is to provide a cable capable of considerably reducing capacitance occurring with a conductor.

A cable according to an aspect of the present invention includes: a linear conductor; a plurality of hollow tubes made of resin and which are disposed around the conductor so that an air layer is formed around the conductor, the hollow tubes extending in a longitudinal direction of the conductor; and an insulating protective member configured to protect the conductor and the plurality of hollow tubes.

According to the cable of the aspect above, the plurality of hollow tubes form an air layer around the conductor, and therefore the capacitance occurring between the conductor and the working fluid is considerably reduced.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

The cable of the present invention will be described in detail below in conjunction with preferred embodiments while referring to the accompanying drawings.

[Embodiment]

Figure 1:
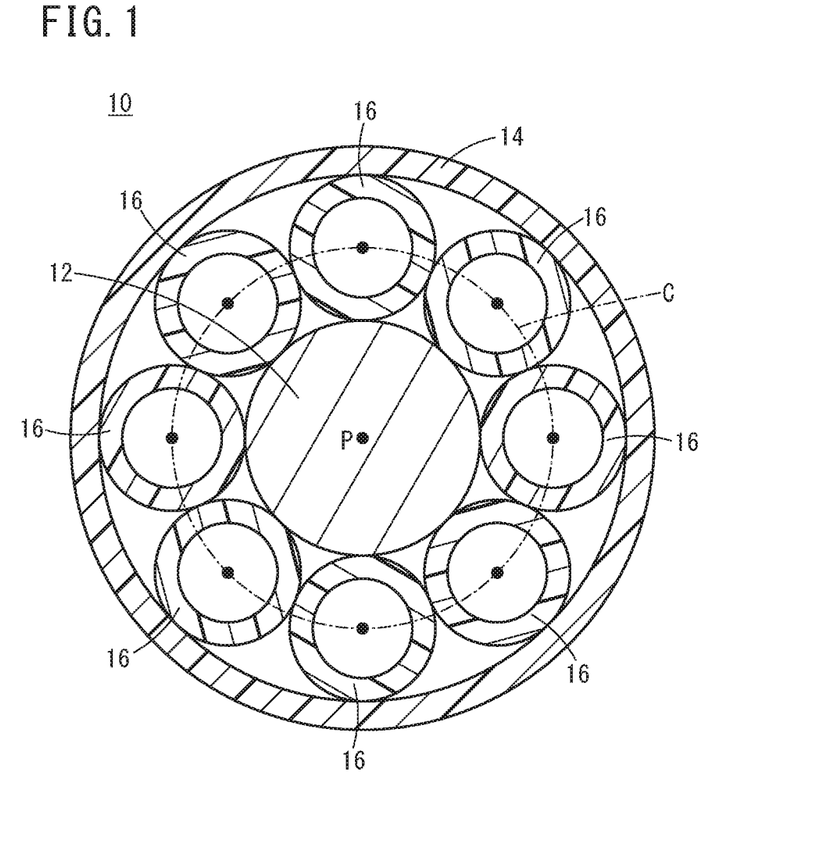
FIG. 1 is a schematic diagram showing a cross section of a cable according to an embodiment.

FIG. 1 is a schematic diagram showing a cross section of a cable 10 of an embodiment. FIG. 1 shows a cross section of the cable 10 taken along a direction orthogonal to its longitudinal direction. The cable 10 of this embodiment is employed as a feeding cable for applying voltage to a wire of a wire electrical discharge machine, or as a signal cable for measuring voltage applied to a wire of a wire electrical discharge machine. The cable 10 is placed in the interior of a work pan. The cable 10 mainly includes a conductor 12, a protective member 14, and a plurality of hollow tubes 16.

The conductor 12 is a transmission path on which voltage or signal is transmitted, and the conductor 12 is in the form of a line (a linear form). The external shape of the cross section of the conductor 12 in the direction orthogonal to the longitudinal direction is circular in FIG. 1, but it can be other shape.

The protective member 14 is an insulating member for protecting the conductor 12 and the plurality of hollow tubes 16. In this embodiment, the protective member 14 has a tubular form, and is disposed so as to surround the plurality of hollow tubes 16. Examples of material for making the protective member 14 include rubber, resin, etc., for example.

The plurality of hollow tubes 16 are tubes made of resin and which are arranged around the conductor 12 such that an air layer is formed around the conductor 12, and the plurality of hollow tubes 16 linearly extend along the longitudinal direction of the conductor 12. Examples of resin for making the hollow tubes 16 include silicone resin chiefly containing silicon, for example.

In this embodiment, the air layer formed around the conductor 12 by the plurality of hollow tubes 16 includes the interiors of the hollow tubes 16 and gaps outside the hollow tubes 16. In this embodiment, each hollow tube 16 is in contact with the outer circumferential surface of the conductor 12 and the inner circumferential surface of the tubular protective member 14, and adjacent ones of the plurality of hollow tubes 16 are in contact with each other. Accordingly, the gaps outside the hollow tubes 16 include the portions surrounded by the outer circumferential surfaces of the hollow tubes 16 and the outer circumferential surface of the conductor 12 and the portions surrounded by the outer circumferential surfaces of the hollow tubes 16 and the inner circumferential surface of the tubular protective member 14.

In the cross section of the cable 10 taken along the direction orthogonal to the longitudinal direction, the outer peripheral shape and the inner peripheral shape of the hollow tubes 16 are substantially circular, and the plurality of hollow tubes 16 have substantially the same outer diameter and inner diameter. Also, in the cross section of the cable 10 taken along the direction orthogonal to the longitudinal direction, the center position of the circle C passing through the center positions of the respective hollow tubes 16 substantially coincides with the center position P of the conductor 12.

As described above, the cable 10 of this embodiment includes the plurality of hollow tubes 16, and the hollow tubes 16 form an air layer around the conductor 12. Accordingly, even when the cable 10 is immersed in a dielectric working fluid stored in a work pan of a wire electrical discharge machine, the capacitance occurring between the working fluid and the conductor 12 can be considerably reduced. As a result, the cable 10 becomes less likely to leak electricity through the working fluid.

Furthermore, adjacent ones of the plurality of hollow tubes 16 are in contact with each other, so that the tubular protective member 14 is prevented from coming in contact with the conductor 12 even when the cable 10 is pressed. Thus, even when the cable 10 is immersed in the working fluid in a pressed state, the capacitance occurring between the working fluid and the conductor 12 can be considerably reduced.

[Modifications]

The above embodiment has been described as an example of the present invention, but the technical scope of the present invention is not limited to the scope described in the embodiment above. Various modifications and improvements can of course be applied to the above-described embodiment. It is clear from the description of claims that embodiments modified or improved in various ways are included in the technical scope of the present invention.

Some of modified or improved embodiments will be described below as modifications. Constituent elements that are equivalent to those described in the embodiment above will be labeled using the same reference numerals, and overlapping descriptions thereof will not be repeated.

[Modification 1]

In the above-described embodiment, the hollow tubes 16 have a substantially circular outer peripheral shape and inner peripheral shape in the cross section taken along the direction orthogonal to the longitudinal direction of the cable 10. However, at least one of the outer peripheral shape and the inner peripheral shape may be other shape than a circle.

Further, in the above-described embodiment, the plurality of hollow tubes 16 have substantially the same outer diameter and inner diameter in the cross section taken along the direction orthogonal to the longitudinal direction of the cable 10. However, all of the plurality of hollow tubes 16 may have different outer diameters, or some of the plurality of hollow tubes 16 may have a different outer diameter from others. In the same way, all of the plurality of hollow tubes 16 may have different inner diameters, or some of the plurality of hollow tubes 16 may have a different inner diameter from others.

[Modification 2]

In the above-described embodiment, adjacent ones of the plurality of hollow tubes 16 disposed around the conductor 12 are in contact with each other. However, the plurality of hollow tubes 16 may be spaced at intervals around the conductor 12. However, as mentioned above, for the purpose of preventing the tubular protective member 14 from coming in contact with the conductor 12 even when the cable 10 is pressed, it is preferred that adjacent ones of the plurality of hollow tubes 16 are in contact with each other.

[Modification 3]

Figure 2:
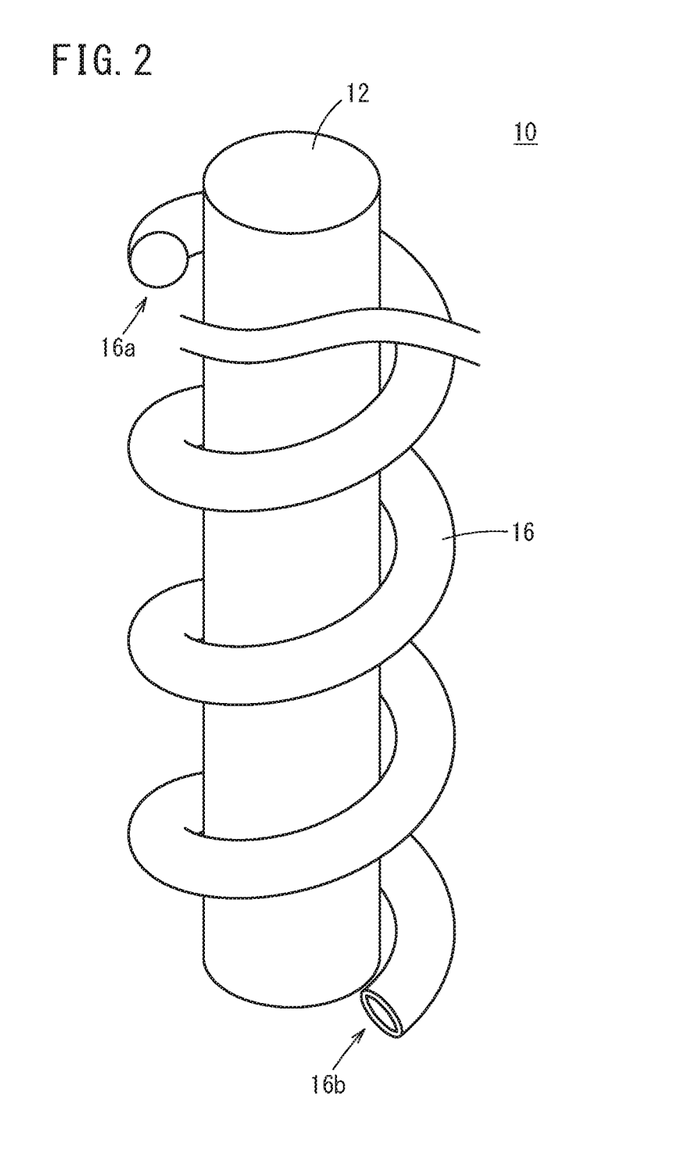
FIG. 2 is a schematic diagram showing Modifications 3 and 4 of the cable.

In the above-described embodiment, the hollow tubes 16 linearly extend along the longitudinal direction of the conductor 12. However, as shown in FIG. 2, hollow tubes 16 may helically extend along the outer periphery of the conductor 12. This makes it easier to suppress relative positional shift of the hollow tubes 16 even when the cable 10 is bent. In order to facilitate understanding, FIG. 2 only shows a single hollow tube 16 and omits the protective member 14.

[Modification 4]

Further, as shown also in FIG. 2, one end 16a of the ends 16a, 16b of the hollow tube 16 in the longitudinal direction may be closed. Closing one end 16a prevents the working fluid stored in the work pan from getting into the hollow tube 16 even when a portion of the cable 10 corresponding to the closed one end is placed inside the work pan of a wire electrical discharge machine. That is, it is preferable that, as one end 16a of the hollow tube 16, the end 16a on the side placed inside the work pan of the wire electrical discharge machine be closed. The other end 16b of the hollow tube 16 on the opposite side to the one end 16a may be closed.

[Modification 5]

Figure 3:
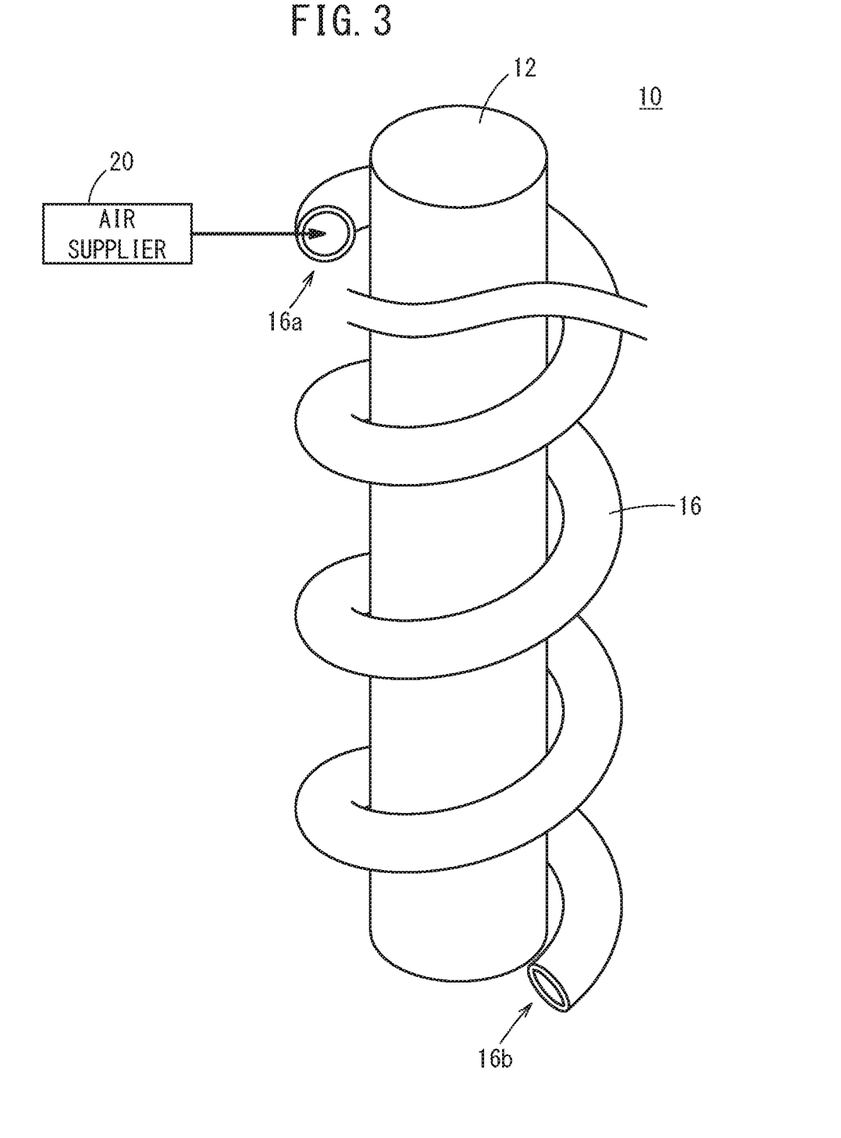
FIG. 3 is a schematic diagram showing Modification 5 of the cable.

Further, as shown in FIG. 3, when the one end 16a and the other end 16b of the hollow tube 16 are both opened without being closed, then air may be supplied to the hollow tube 16 from an air supplier 20. Then, even when the working fluid gets into the hollow tube 16, the working fluid can be discharged out of the tube. Air from the air supplier 20 may be supplied to all of the plurality of hollow tubes 16. Alternatively, when a plurality of hollow tubes 16 communicate with each other, air may be supplied from the air supplier 20 only to some of the plurality of hollow tubes 16.

[Modification 6]

Figure 4:
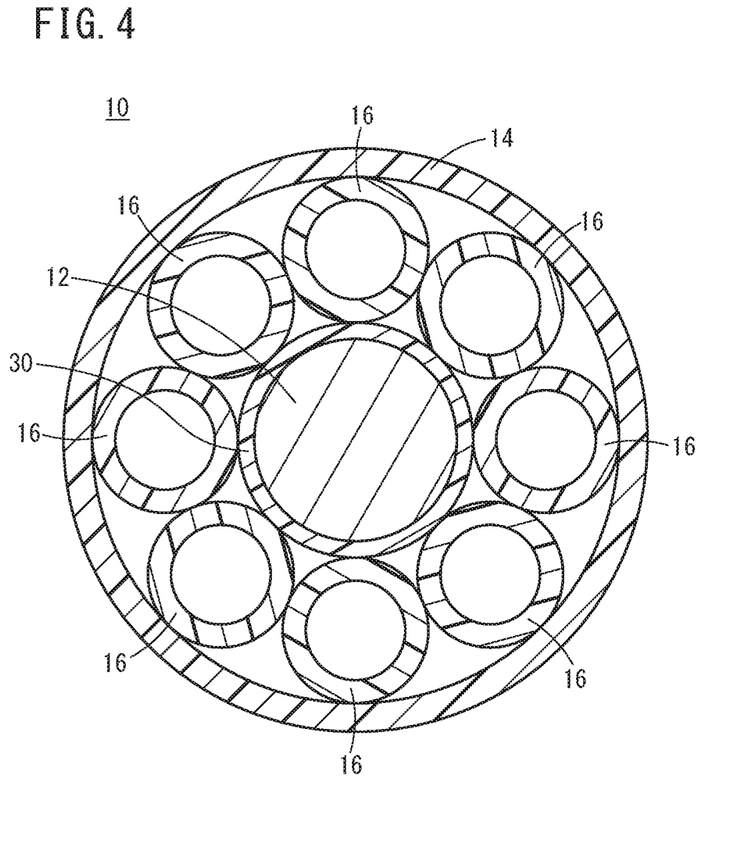
FIG. 4 is a schematic diagram showing a cross section of Modification 6 of the cable.

In the above-described embodiment, the outer periphery of the conductor 12 is not coated. However, as shown in FIG. 4, the conductor 12 may be provided with a coating member 30 made of resin and coating (covering) its outer periphery. This lengthens the distance between the conductor 12 and the protective member 14 as compared to cases where the coating member 30 is absent. This further reduces the capacitance occurring between the working fluid and the conductor 12.

[Modification 7]

Figure 5:
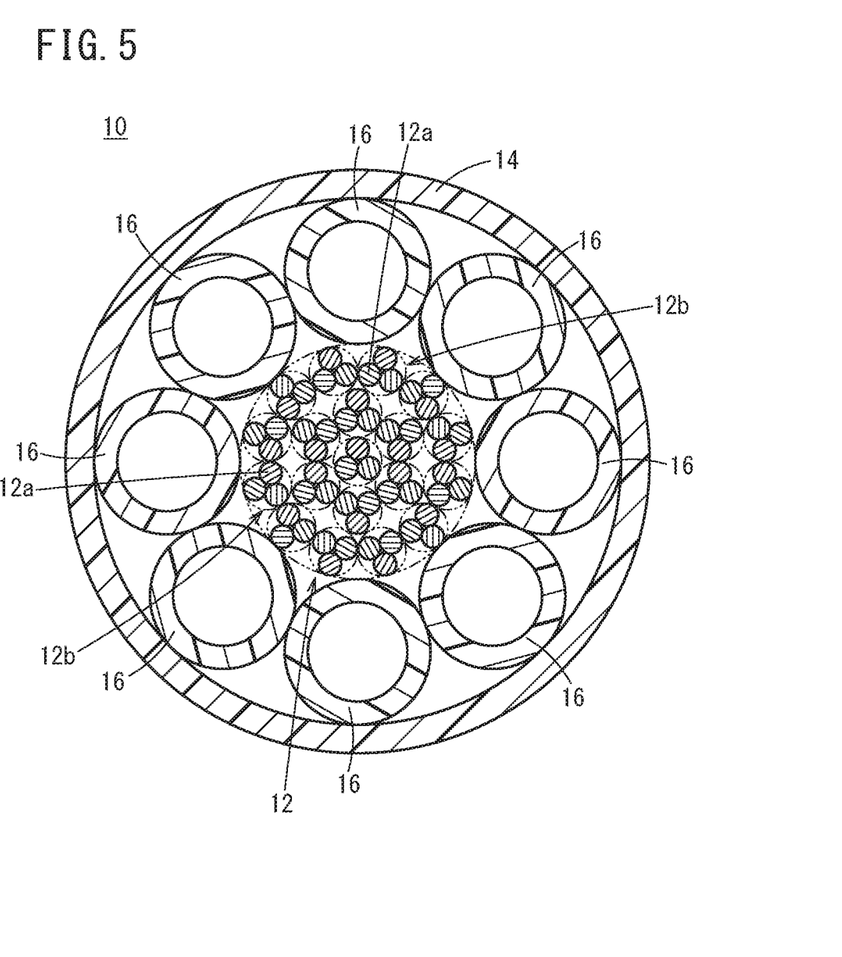
FIG. 5 is a schematic diagram showing a cross section of Modification 7 of the cable.

In the above-described embodiment, the conductor 12 has a form of a single line. However, as shown in FIG. 5, the conductor 12 may be formed by twisting together bundles 12b of a plurality of strands 12a into a rope shape. Then, gaps are formed between the bundles 12b on the outer circumferential side of the conductor 12, and accordingly the proportion of gap inside the tubular protective member 14 is enlarged as compared to cases where the conductor 12 is in the form of a single line. This further reduces the capacitance occurring with the conductor 12. The plurality of strands 12a may be arranged in parallel, or may be twisted together.

[Modification 8]

Figure 6:
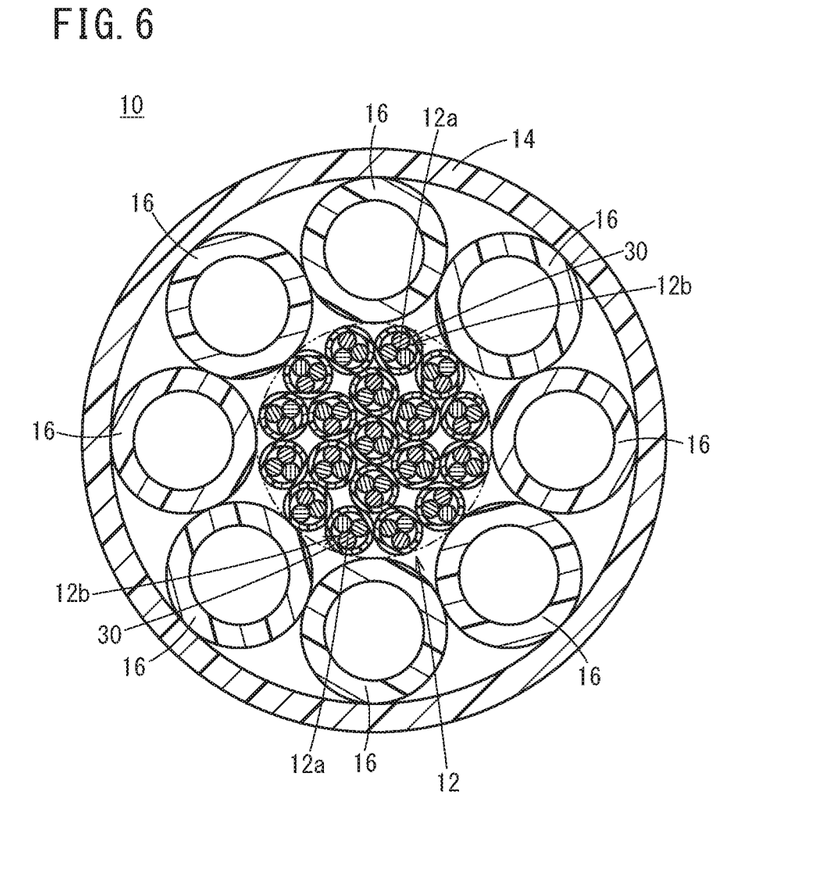
FIG. 6 is a schematic diagram showing a cross section of Modification 8 of the cable.

Further, as shown in FIG. 6, when the conductor 12 is formed by twisting bundles 12b of a plurality of strands 12a into a rope shape, each bundle 12b may be individually coated (covered) with a coating member 30. As in the case described above, this also lengthens the distance between the conductor 12 and the protective member 14 as compared to cases where the coating members 30 are absent. This makes it possible to further reduce the capacitance occurring between the working fluid and the conductor 12.

[Modification 9[

Figure 7:
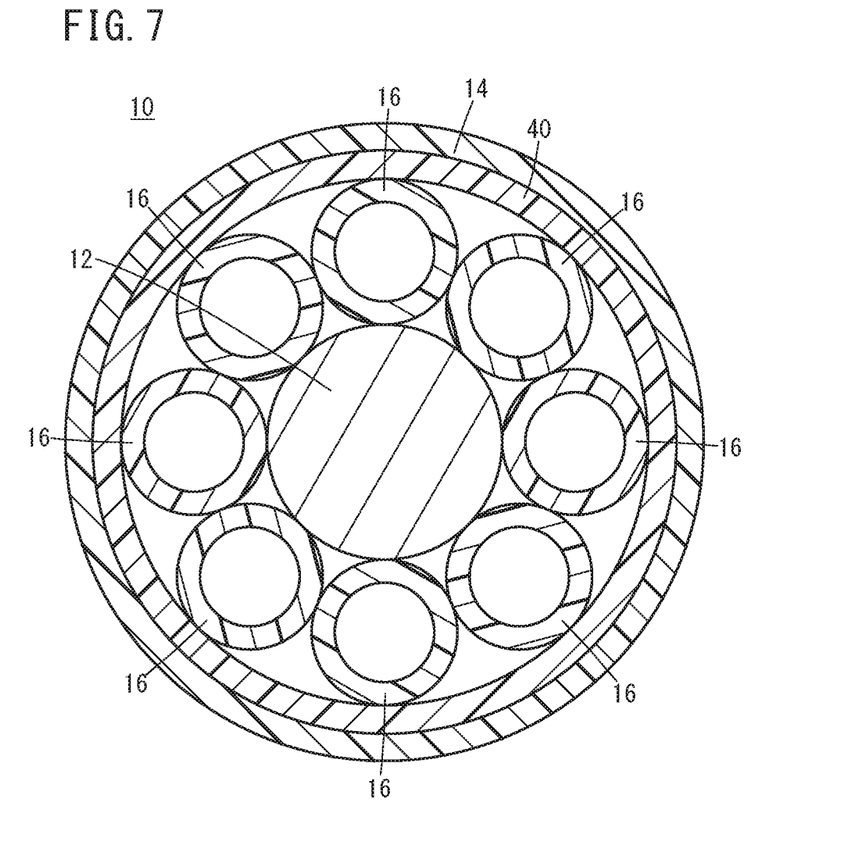
FIG. 7 is a schematic diagram showing a cross section of Modification 9 of the cable.

In the above-described embodiment, the cable 10 is a cable which has the single conductor 12. However, as shown in FIG. 7, the cable 10 may be a coaxial cable which includes the conductor 12 located on the inside of the plurality of hollow tubes 16 and a tubular second conductor 40 located on the outside of the plurality of hollow tubes 16. The second conductor 40 is disposed inside the tubular protective member 14, and the conductor 12 and the plurality of hollow tubes 16 are inserted therein. When the conductor 12 is connected to a wire electrode of a wire electrical discharge machine, the second conductor 40 is connected to a table in the work pan of the wire electrical discharge machine. The table is a table on which a workpiece is placed. When the conductor 12 is connected to the table, the second conductor 40 is connected to the wire electrode. According to such a coaxial cable, the plurality of hollow tubes 16 reduce the capacitance between the conductor 12 and the second conductor 40.

[Modification 10]

Figure 8:
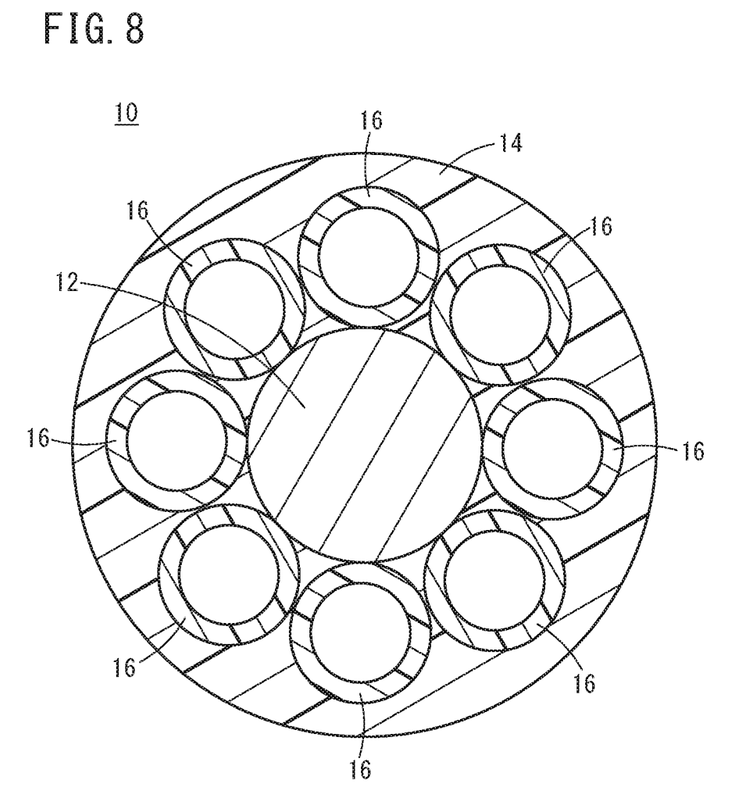
FIG. 8 is a schematic diagram showing a cross section of Modification 10 of the cable.

In the above-described embodiment, the protective member 14 is a tubular member that surrounds the plurality of hollow tubes 16. However, as shown in FIG. 8, the protective member 14 may surround the conductor 12 and the plurality of hollow tubes 16 without leaving any gap. In such a case, the air layer formed around the conductor 12 by the plurality of hollow tubes 16 is formed only inside the hollow tubes 16. As in the case of the above-described embodiment, this also further reduces the capacitance occurring between the working fluid and the conductor 12.

[Modification 11]

In the above-described embodiment, the cable 10 is placed inside a work pan of a wire electrical discharge machine, but the cable 10 may be disposed inside or outside other equipment. That is to say, the cable may be employed as a feeding cable for applying voltage to other equipment than a wire electrical discharge machine, or as a signal cable for sending and receiving signals to and from other equipment.

[Modification 12]

The above-described embodiment and the above-described modifications 1 to 11 may be arbitrarily combined within a range where no contradiction is incurred.

[Technical Ideas]

Technical ideas offered by the embodiment and modifications described above will be described below.

The cable (10) includes a linear conductor (12); a plurality of hollow tubes (16) made of resin and which are disposed around the conductor (12) such that an air layer is formed around the conductor (12), the hollow tubes extending in a longitudinal direction of the conductor (12); and an insulating protective member (14) configured to protect the conductor (12) and the plurality of hollow tubes (16).

According to the cable (10), the plurality of hollow tubes (16) form an air layer around the conductor (12), and it is therefore possible to considerably reduce the capacitance occurring with the conductor (12).

Adjacent ones of the plurality of hollow tubes (16) may be in contact with each other. This makes it possible to prevent the protective member (14) from coming into contact with the conductor (12) even when the cable (10) is pressed. Thus, even when the cable (10) is kept in a pressed state, the capacitance occurring with the conductor (12) can be considerably reduced.

The hollow tubes (16) may helically extend along an outer peripheral surface of the conductor (12). This makes it easy to suppress relative positional shift of the hollow tubes (16) even when the cable (10) is bent.

At least one end (16a) of the hollow tubes (16) may be closed. With this structure, even when the portion of the cable (10) on the one end (16a) side is placed inside a work pan of a wire electrical discharge machine, it is possible to prevent the working fluid stored in the work pan from getting into the hollow tubes (16).

Air may be supplied into the hollow tubes (16). With this structure, even when working fluid gets into the hollow tubes (16), the working fluid can be discharged out of the tubes.

The cable (10) may further include a resin coating member (30) configured to cover an outer peripheral surface of the conductor (12). Then, the distance between the conductor (12) and the protective member (14) is lengthened as compared to cases where the coating member (30) is absent. This further reduces the capacitance occurring with the conductor (12).

The conductor (12) may be formed by twisting together bundles (12b) of a plurality of strands (12a) into a rope shape. With this structure, gaps are formed between the bundles (12b) on the outer peripheral side of the conductor (12), and accordingly the proportion of gap inside the protective member (14) is enlarged as compared to cases where the conductor (12) is in the form of a single line. This further reduces the capacitance occurring with the conductor (12).

Each of the bundles (12b) may be coated with a coating member (30). Then, the distance between the conductor (12) and the protective member (14) is lengthened as compared to cases where the coating member (30) is absent. This further reduces the capacitance occurring with the conductor (12).

The cable (10) may further include a tubular second conductor (40) which is disposed on an inside of the protective member (14) and in which the conductor (12) and the plurality of hollow tubes (16) are inserted. With this structure, the capacitance between the conductor (12) and the second conductor (40) is reduced by the plurality of hollow tubes (16).

The protective member (14) may surround the conductor (12) and the plurality of hollow tubes (16) without leaving a gap, or may be a tubular member surrounding the plurality of hollow tubes (16).

Figure 9:
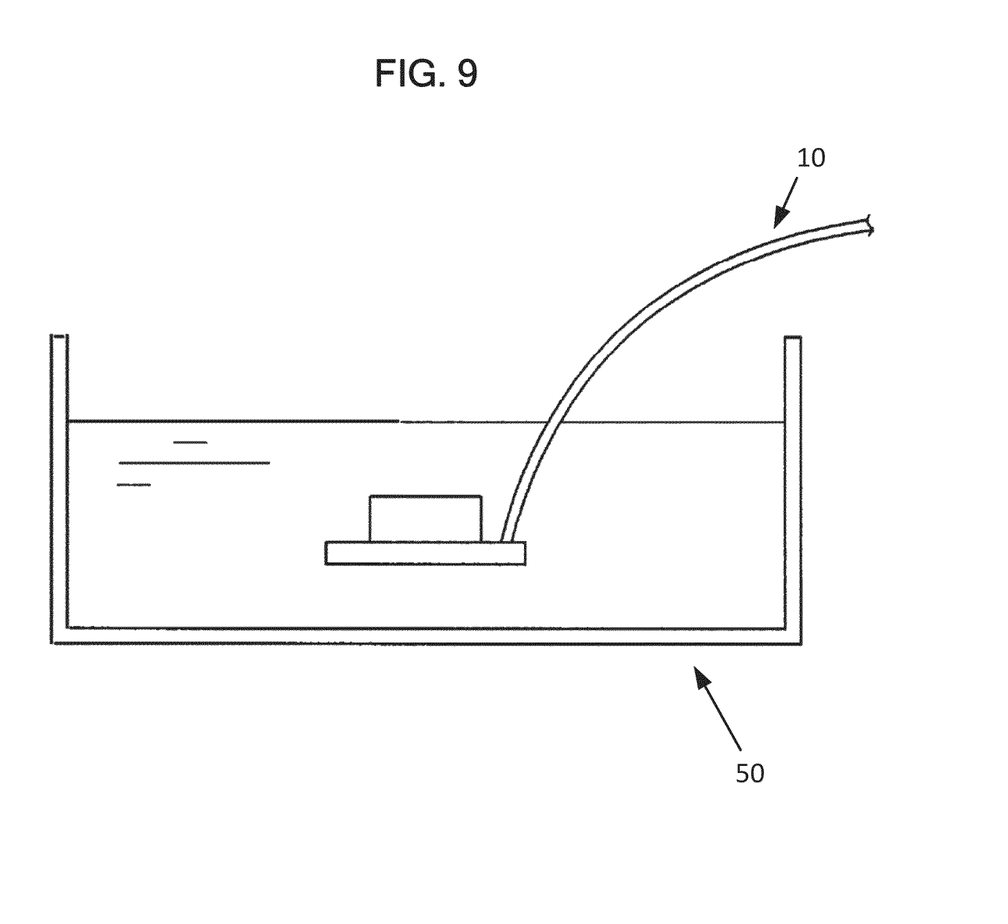
FIG. 9 is a schematic diagram showing a cable placed in an interior of a work pan of a wire electrical discharge machine.

The cable (10) may be placed in an interior of a work pan (50) of a wire electrical discharge machine.

What is claimed is:

1. A cable comprising:
a linear conductor;
a plurality of hollow tubes made of resin and which are disposed around the conductor so that an air layer is formed around the conductor, the hollow tubes extending in a longitudinal direction of the conductor; and
an insulating protective member configured to protect the conductor and the plurality of hollow tubes, wherein the insulating protective member surrounds the linear conductor and the plurality of hollow tubes without leaving a gap, the insulating protective member being in direct contact with the linear conductor, the insulating protective member having an outer peripheral edge defining an outer periphery of the cable, wherein a region extends between the outer peripheral edge of the insulating protective member and an outer peripheral edge of the linear conductor, the region consisting essentially of the insulating protective member, the plurality of hollow tubes, and the air layer.

2. The cable according to claim 1, wherein adjacent ones of the plurality of hollow tubes are in contact with each other.

3. The cable according to claim 1, wherein the hollow tubes helically extend along an outer peripheral surface of the conductor.

4. The cable according to claim 1, wherein at least one end of the hollow tubes is closed.

5. The cable according to claim 1, wherein the protective member is a tubular member surrounding the plurality of hollow tubes.

6. The cable according to claim 1, wherein ends of the hollow tubes that are placed in an interior of a work pan of a wire electrical discharge machine are closed.

* * * * *